United States Patent [19]

Rothbühr et al.

[11] Patent Number: 4,636,375
[45] Date of Patent: Jan. 13, 1987

[54] PROCESS FOR PRODUCING FURNACE BLACKS OF VARIABLE CARBON BLACK STRUCTURE

[75] Inventors: Lothar Rothbühr, Hürth-Hermülheim; Gerhard Kühner, Hanau, both of Fed. Rep. of Germany

[73] Assignee: Degussa Aktiengesellschaft, Frankfurt, Fed. Rep. of Germany

[21] Appl. No.: 451,303

[22] Filed: Dec. 20, 1982

Related U.S. Application Data

[63] Continuation of Ser. No. 203,843, Nov. 4, 1980, abandoned.

[30] Foreign Application Priority Data

Nov. 7, 1979 [DE] Fed. Rep. of Germany ....... 2944855

[51] Int. Cl.$^4$ .......................... C01B 31/02; C09C 1/48
[52] U.S. Cl. .................... 423/450; 423/449; 423/455; 423/456
[58] Field of Search ................ 423/449, 450, 455, 456

[56] References Cited

U.S. PATENT DOCUMENTS

| | | | |
|---|---|---|---|
| 2,672,402 | 3/1954 | Stokes | 423/220 |
| 3,369,870 | 2/1968 | Ganz et al. | 423/450 |
| 3,438,732 | 4/1969 | Morel | 423/450 |
| 3,642,446 | 2/1972 | Heller et al. | 423/455 |
| 3,645,685 | 2/1972 | Crouch | 423/450 |
| 4,088,741 | 5/1978 | Takewell | 423/450 |
| 4,256,720 | 3/1981 | Kallenberger | 423/450 |
| 4,372,936 | 2/1983 | Surovikin et al. | 423/450 |

FOREIGN PATENT DOCUMENTS

| | | |
|---|---|---|
| 622692 | 9/1962 | Belgium . |
| 779854 | 3/1968 | Canada ................... 423/450 |
| 778207 | 7/1957 | Fed. Rep. of Germany . |
| 1130100 | 5/1962 | Fed. Rep. of Germany . |
| 1592913 | 4/1971 | Fed. Rep. of Germany . |
| 1592863 | 12/1971 | Fed. Rep. of Germany . |
| 1592949 | 3/1972 | Fed. Rep. of Germany . |
| 1592864 | 8/1973 | Fed. Rep. of Germany . |
| 2530371 | 1/1977 | Fed. Rep. of Germany . |
| 2726183 | 12/1977 | Fed. Rep. of Germany . |
| 2827872 | 1/1980 | Fed. Rep. of Germany . |
| 1011093 | 6/1952 | France . |

OTHER PUBLICATIONS

Ullmans, Encyclopedia of Technical Chemistry, vol. 14, 4 ed. 1977, pp. 637–640.

Primary Examiner—Gregory A. Heller
Attorney, Agent, or Firm—Beveridge, DeGrandi & Weilacher

[57] ABSTRACT

A process for the production of furnace blacks of variable carbon black structure according to the customary furnace black technology is disclosed, whereby a low ratio is adjusted between combustion air and carbon black raw material for achieving high yields and large raw material through-puts, and wherein for lowering of the carbon black structure the carbon black produced is removed entirely or partly from the exhaust gases and the residual gas thus obtained is completely or partially recycled to the combustion chamber of the reactor.

4 Claims, 2 Drawing Figures

PROCESS FOR PRODUCING FURNACE BLACKS OF VARIABLE CARBON BLACK STRUCTURE

REFERENCE TO A RELATED APPLICATION

This is a continuation of our copending application Ser. No. 203,843 filed Nov. 4, 1980, now abandoned, which is relied on herein.

The production of carbon black by the oven black or furnace black process today supplies the primary requirements of the rubber and plastics industry as well as the requirements for technical articles and for dyestuffs. The environmentally favorable and completely closed method of operation, the possibilities for automation and for the efficient utilization of energy have contributed to this position of prominence as compared to other formerly wide-spread processes. An important factor, however, is also the multiplicity of possible variations, which permits the production of a variety of tailor made carbon black qualities which was formerly not possible.

In the case of furnace black processes, hot combustion gases are produced with the help of a fuel gas or a liquid fuel, into which the carbon black raw material (for example, highly aromatic oils) is sprayed. Subsequently, water is injected into the furnace black reactor, in order to discontinue the reaction. Finally, the carbon black contained in the exhaust gases is separated in conventional equipment (Ullmann Encyclopedia, 4th Edition, Vol. 14/1977, which is relied on herein.)

The three parameters, fuel gas (or fuel), combustion air and carbon black raw material quantity are decisive values for the operation of a carbon black reactor, for the quantity of produced carbon black and the yield as well as for the achieveable quality of the carbon black. These values in case of the furnace black production are not variable arbitrarily. The following limiting factors are generally controlling:

The volume of combustion air used determines the developing volume of exhaust gas and thus fixes the through-put of the production plant. In view of a profitable method of operation, one will strive to realize the maximumally useable volume of combustion air.

The fuel gas required for energy production (or some other fuel) is mostly employed in such volumes, related to the volume of oxygen introduced with the combustion air, that it is present in deficiency. On the other hand, it is one of the principles of the furnace black process that the volume of oxygen is used in deficiency relative to the fuel and carbon black raw material volume. Whenever one wishes to achieve high yields, i.e., whenever as little as possible air-oxygen is to come into contact with the carbon black raw material and is to burn the latter, as high volumes as possible as fuel gas are used. A 60-70% turnover of the air-oxygen with the fuel gas is a value quite customary in practice. A limitation on the fuel gas volume used arises primarily from the temperature resistance of the ceramic lining because a high amount of fuel gas leads to higher temperature loads.

Whenever one starts with a method of operation which uses the maximum combustion air volume and the greatest possible fuel gas volume, then the carbon black raw material volume is also fixed by the selection of the carbon black quality: higher inputs of oil lead to coarser carbon black (larger primary particle size) with higher yields, lower oil volumes on the contrary lead to correspondingly finer carbon black (smaller primary particle size) with lower yields.

Among the most important parameters, which are responsible for the characteristics of the carbon blacks, one may mention in the first place the primary particle size and the various surface measuring value connected with it. Small primary particle sizes at the same time correspond to essentially high surface area measurement values. As the best known values in the field of carbon blacks in this case, the measurement of the BET surface value according to DIN 66 132, the iodine absorption number according to DIN 53 582 and the CTAB surface for carbon blacks is determined.

Another important parameter, which determines the characteristics of carbon black is the "carbon black structure". By carbon black structure is meant the degree of bonding together of the primary carbon black particles or of the coherence of the primary carbon black particles. A real measurement of this degree of aggregation of the primary carbon black particles however, could only be accomplished by evaluation of electron-microscope pictures. Since that is very time consuming and expensive, other measuring methods are used for determination of the carbon black structure.

The most customary is the "DBP-absorption" according to DIN 53 601. Here the air between the carbon black particles is displaced by a fluid, dibutylpthalate (DBP).

Since highly structured carbon blacks because of their bulky structures have a large intermediate air space, they also have a high DBP-number. High DBP-numbers, thus, correspond to a high carbon black structure, low DBP-numbers to a low carbon structure.

Recently, efforts of utilizing the carbon black raw materials even better than hitherto have been made because of the shortage and increases in price of the carbon black raw materials from an oil base. This means that an even higher percentage of a given volume of carbon black oil is converted into carbon black, i.e., the yield (kg carbon black/kg carbon black raw material) is improved. An increase of production with constant or reduced fuel gas or fuel consumption (kg fuel per kg carbon black) is an important energy saving measure.

One possibility, which leads to a reduction of the specific fuel input and to the increase of the yield, is the boost in the combustion air temperature. According to the German patent application No. P 28 27 872, higher combustion air temperatures than those known hitherto, are used. From this publication, one may also see, that high yields are coupled with a low combustion air/carbon black raw material ratio. In case of the conditions, resulting in a high yield, one may use considerably more oil for any given volume of air, i.e., the combustion air/carbon black raw material ratio is low.

However, it is known from German patent No. 15 98 864 of the assignee that by a boost of the temperature of the reaction air (combustion air) the carbon black structure (DBP-number) also increases.

The increase in combustion air temperature at a constant combustion air volume means that more energy reaches the reactor. In order to equalize this, the carbon black raw material volume must be increased.

An energy-saving measure of increasing the combustion air temperature may, however, lead to difficulties, whenever so-called "low structure carbon blacks" are to be produced. The problem becomes particularly grave, in case of the production of medium or coarse carbon blacks, since there the raw material concentration in the reaction chamber is higher than in the case of fine carbon blacks. In the case of coarse carbon blacks another difficulty is added, that coke may be formed, which is deposited in the furnace on the one hand and thus leads to breakdowns and on the other hand contaminates the carbon black product with coke grit.

As is known, in the case of the furnace black process, the carbon black structure may be reduced by the DBP-number with the help of small quantities of alkali salts, which are added to the process. It turned out that this measure in the case of the transition to high concentrations of carbon black raw material, as may occur in the situation of the use of high combustion air temperatures, or in the case of the production of medium or coarse carbon black, is no longer sufficient, even though the addition of alkali salts is considerably increased.

Thus there existed a task for determining measures which, while maintaining a low specific fuel consumption and high yields, would permit a reduction of the carbon black structure.

In order to eliminate the described difficulties, several measures are already known.

According to German OS No. 27 26 183, it is proposed to distribute the combustion air to two zones. The combustion air fed into the second zone has the task of "burning away" the bridges of carbon black developing between the individual carbon black particles, in order to achieve a reduction of the structure in this way. This measure is sufficient in the process described in the cited German OS but does not indicate any way for a solution whenever the carbon black concentration is raised beyond the standard measure as happens, for example, when raising the temperature of the combustion air.

Other known measures regarding the apparatus, such as for example, a change of the injection angle of the oil in-put (German Pat. No. 1,595,949) do not lead to the desired result either, since there the danger of coke formulation has not been eliminated. Also, the use of the method of operation according to German Pat. No. 1,492,863 of the assignee is not suitable, because the increase of the gas used would destroy the reactor lining at the high air temperature.

It has now developed, surprisingly even for the expert, that the striven-for goal will be achieved, whenever a lean gas with low heating value is introduced into the reactor. The exhaust gas of the furnace black process, free of carbon black, may be used as such a lean gas. The present application therefore, deals with such a process for the production of furnace blacks of variable carbon black structures of burning a fuel with air in a combustion chamber of a furnace black reactor producing, hot gases, injection of liquid carbon black raw material into the hot gases at a downstream point from the point of introduction of the fuel and completion of the reaction further downstream by injection of water and cooling. Thereby, for achieving of high yields and great raw material through-puts a low ratio combustion air/carbon black raw material is adjusted which is characterized in that for reduction of the carbon black structure, the carbon black produced from the exhaust gases is wholly or partly (i.e. ad 80 to 90%) removed, and the residual gas thus obtained is recycled wholly or partly to the combustion chamber.

At the same time, the carbon black structure may be gradually lowered by increasing the recycled volume of exhaust gas.

The process may be combined with addition of alkali-metal compounds which as is well known also act in a structure lowering manner.

According to a particularly favorable variation of the process, loss combustion air/carbon black raw material ratios may be achieved by using strongly preheated reaction air at a temperature in the range of 400–1200, preferably 550°–1050° C.

A method of the process where the recycled exhaust gas is used at a temperature of 100°–1200° C., preferably at a temperature of 500°–1050° C. is used, also offers advantages.

To be sure, there already exist proposals for recycling of residual gases in the production of gas carbon blacks (French Pat. No. 1,011,093 and German Pat. No. 1,130,100). Both proposals however use oxygen instead of air and their goal is using carbon black raw material and exhaust gas instead of fuel. According to Brit. Pat. No. 778,207, likewise oxygen is used instead of air whereby the production of carbon black in combination with synthesis gas is pursued as the goal.

According to the German Pat. No. 622,692 of the assignee one also operates with the recycling of exhaust gas, however, the exhaust gas is only used as a carrier of light gasoline for the fuel. The method of operation disclosed in German AS No. 15 92 913 ultimately differs from the method of operation of this invention in that the air volume is limited to the volume required for the theoretical burning of the fuel, and in that the exhaust gas is free of hydrogen and carbon monoxide.

The process of the invention clearly distinguishes from the teachings of previously cited documents. Contrary thereto, the present invention relates to:

A process for the production of oil furnace black.

It operates with air and not with oxygen enrichment, since the oxygen enrichment would have the opposite effect.

It does not lead to the production of synthesis gas, since other preconditions are necessary for that.

It does not employ the exhaust gas as a carrier for energy-rich fuels and hereto, it is distinguishable both in regard to the process as well as in regard to the achievable effect decisively from the object of the invention.

Finally neither $H_2$ nor CO is removed from the exhaust gas. On the contrary, the presence of these not-inert components is desired and an advantage of the present invention.

The deviations from the above cited prior art are understandable, since there is a completely different goal too: it is mostly a matter of lowering the carbon black structure at conditions (such as extremely high carbon black concentrations), which make reaching the goal difficult.

The invention is further illustrated by the drawings, wherein.

The invention may be illustrated by way of several examples, which point up the advantages of the method of operation of the invention, but are not intended to limit the concept of the invention. Before the examples, a summary of the raw materials used, is presented:

| Natural Gas: | carbon dioxide | 1.0 vol % |
| --- | --- | --- |
| | methane | 81.6 vol % |
| | nitrogen | 13.8 vol % |
| | ethane | 2.9 vol % |
| | higher hydrocarbons | 0.7 vol % |
| Carbon black raw material: | | |
| density | g/ml | 1.137 |
| distillation residue | g/100 ml | 3.4 |
| residue acc. to Conradson | % | 1.6 |
| asphaltenes | % | 1.1 |
| insoluble benzenes | % | 0.02 |
| Boiling Behavior: | | |
| beginning of boiling | °C. | 241 |
| | 5 vol % °C. | 290 |
| | 10 vol % °C. | 306 |
| | 20 vol % °C. | 327 |
| | 30 vol % °C. | 335 |
| | 40 vol % °C. | 345 |
| | 50 vol % °C. | 352 |
| | 60 vol % °C. | 362 |
| | 70 vol % °C. | 375 |
| | 80 vol % °C. | 392 | chamber, water was sprayed in. After further cooling-off the carbon black was separated and its volume determined. In the case of all experimental runs, operations were such that a carbon black of constant primary particle size or of constant surface size was produced. Values such as yields etc., are comparable only under those conditions. Using always equal volumes of air, air temperature and fuel gas volume, experiments were then carried out, for lowering the high carbon black structure which had occurred at the zero experiment V117. In the experimental series V117–V120 and V148 it was first attempted to lower the carbon black structure measured by the DBP absorption by massive addition of alkali. As can be seen from Table 1, this was successful too, whereby in the case of an addition of 6 g potassium chloride per kg of carbon black raw material the minimum had been reached. A further increase of alkali addition caused no further lowering of the DBP-absorption.

Figure 1:
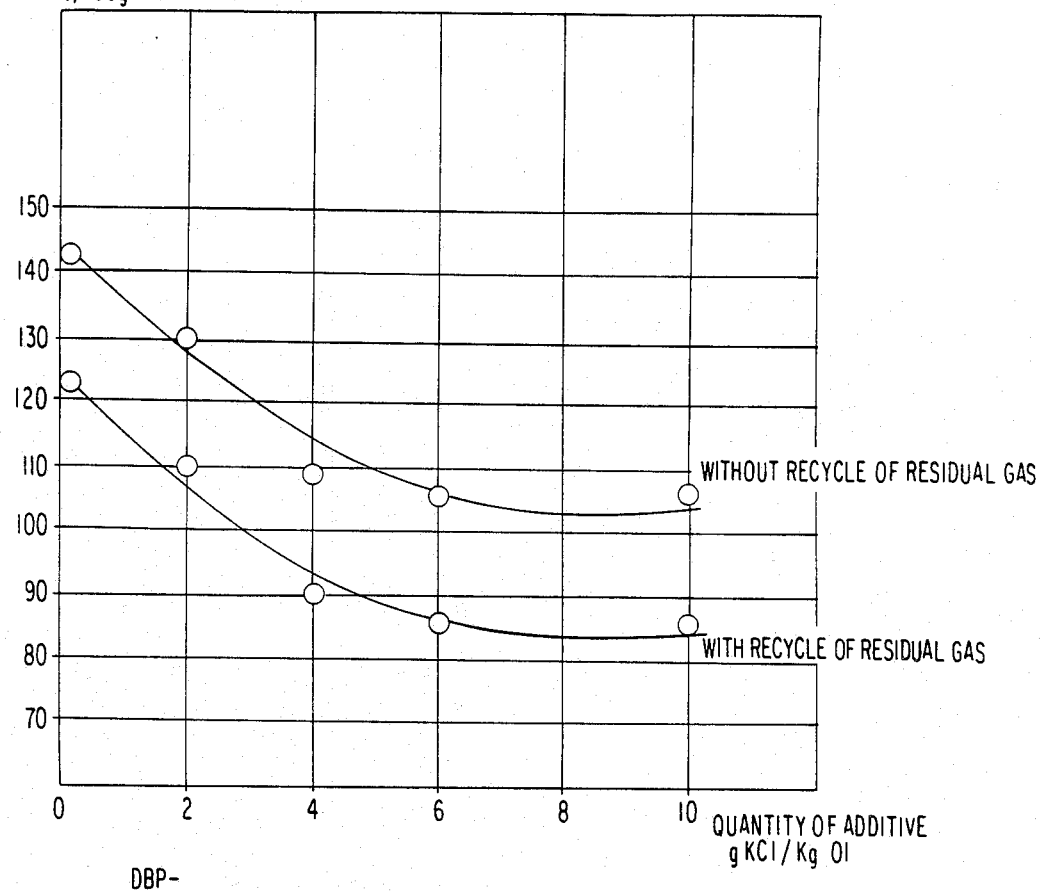
FIG. 1 is a graph showing a plot of DBP-absorption vs. quantity of KCL added, with and without recycling of the residual gas.

Only by the reintroduction of a volume of 10 Nm$^3$/h of essentially carbon black free exhaust gas (temperature of 520° C.) could further lowering of the DBP absorption be achieved. This fact will be apparent from Table 1 and FIG. 1.

TABLE 1

Production of carbon black with a BET surface of 105 m$^2$/g with or without recycle of exhaust gas, air volume 27 Nm$^3$/h (880° C.) constant and natural gas 1.9 Nm$^3$/h constant, (exhaust gas temperature 520° C.)

| | Volume of Exhaust gas Recycled Nm$^3$/h | KCl - Used g/kg Carbon Black Raw Material | Volume Carbon Black Raw Material kg/h | Carbon Black kg/h | Oil Yield % | BET- surface m$^2$/g | DBP absorption ml/100 g |
| --- | --- | --- | --- | --- | --- | --- | --- |
| V117 | 0 | 0 | 7.860 | 4.940 | 62.8 | 102.0 | 143 |
| V125 | 10 | 0 | 7.900 | 4.950 | 62.6 | 106.2 | 122 |
| V118 | 0 | 2 | 7.900 | 4.970 | 63.0 | 102.0 | 130 |
| V126 | 10 | 2 | 7.900 | 4.950 | 62.6 | 102.0 | 111 |
| V119 | 0 | 4 | 7.890 | 4.940 | 62.6 | 106.0 | 108 |
| V127 | 10 | 4 | 7.880 | 4.930 | 62.5 | 104.8 | 90 |
| V120 | 0 | 6 | 7.890 | 4.940 | 62.5 | 104.8 | 106 |
| V128 | 10 | 6 | 7.890 | 4.950 | 62.7 | 109.6 | 85 |
| V148 | 0 | 10 | 7.880 | 4.930 | 62.5 | 104.0 | 107 |
| V150 | 10 | 10 | 7.880 | 4.940 | 62.6 | 105.4 | 86 |

EXAMPLE 1

A small furnace black reactor, which essentially corresponds to the reactors of German OS No. 25 30 371 was used for the production of carbon black. The combustion chamber at the same time had a diameter of 190 mm, the mixing chamber a diameter of 40 mm and the reaction chamber one of 60 mm. Mixing chamber and reaction chamber were provided with a fire resistant lining of 220 mm thickness, consisting of two layers. The radiation of the outside wall was kept low by a 100 mm thick mineral wool lining. In the combustion chamber hot combustion gases were produced by burning natural gas with air, in the area of the mixing chamber carbon black raw material was injected, so that carbon black could form in the reaction chamber. At a length of 2000 mm measured from the beginning of the mixing

EXAMPLE 2

The same furnace reactor was used which is described in Example 1. In constrast to Example 1, in which air at a temperature of 880° C. was introduced into the process, Example 2 describes an experimental series in which processing air had a temperature of 520° C. Only two points here examined, first the operating point without addition of alkali compounds and secondly the operative point with 6 g KCl per kg oil, the point with the highest lowering of the structure by alkali. The temperature of the recycled exhaust gas was 520° C. From Table 2, it may be seen already that the effect of the invention becomes fully effective, even if the air temperature and the temperature of the recycled exhaust gases are the same.

TABLE 2

Production of carbon black with a BET-surface of 105 m$^2$/kg with or without return of exhaust gas, air volume 27 Nm$^3$/h (520° C.) constant and natural gas 1.9 Nm$^3$/h constant, (exhaust gas temperature 520° C.)

| | Volume of Exhaust gas Recycled Nm$^3$/h | KCl - insertion g/kg Carbon Black Raw Material | Raw Carbon Black Material kg/h | Carbon Black kg/h | Yield % | BET- surface m$^2$/g | DBP absorption ml/100 g |
| --- | --- | --- | --- | --- | --- | --- | --- |
| V156 | 0 | 0 | 5.560 | 3.220 | 58.0 | 106.0 | 130 |
| V157 | 10 | 0 | 5.510 | 3.195 | 58.0 | 106.2 | 111 |
| V158 | 0 | 6 | 5.600 | 3.235 | 57.8 | 107.4 | 100 |

TABLE 2-continued

Production of carbon black with a BET-surface of 105 m²/kg with or without return of exhaust gas, air volume 27 Nm³/h (520° C.) constant and natural gas 1.9 Nm³/h constant, (exhaust gas temperature 520° C.)

| | Volume of Exhaust gas Recycled Nm³/h | KCl - insertion g/kg Carbon Black Raw Material | Raw Carbon Black Material kg/h | Carbon Black kg/h | Yield % | BET- surface m²/g | DBP absorption ml/100 g |
|---|---|---|---|---|---|---|---|
| V159 | 10 | 6 | 5.460 | 3.110 | 57.0 | 105.0 | 87 |

EXAMPLE 3

It is evident that the quantity of alkali salt added had been varied in Examples 1 and 2, in order to show the limits of this method. However, the addition of recycled exhaust gas remained constant. In order to test the mode of operation of the process of the invention, it was interesting to know whether the addition of quantities of exhaust gas to the combustion chamber per se causes a step wise lowering of the structure or whether a continuous lowering of the carbon black structure is possible by increasing th amount of recycled exhaust gas.

Figure 2:
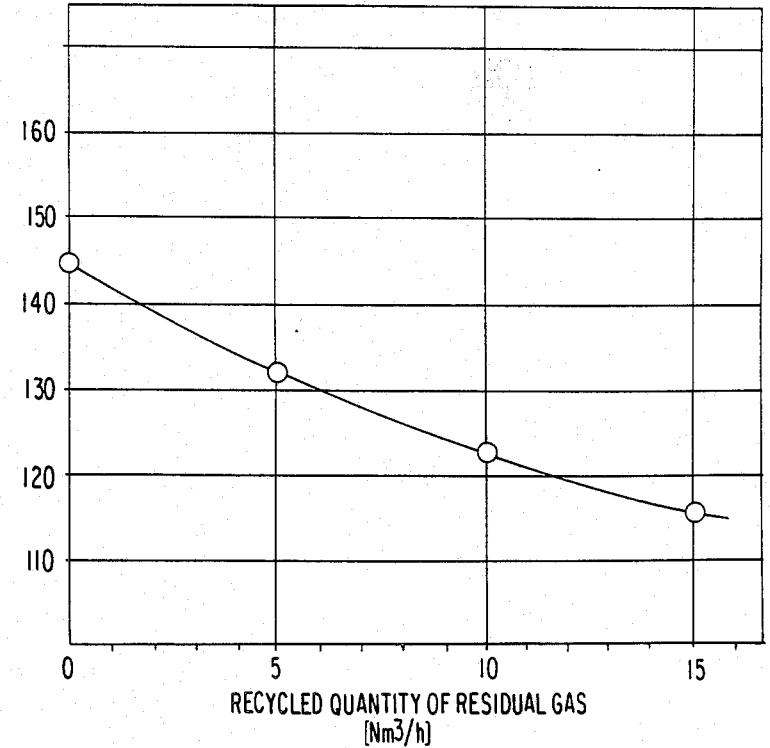
FIG. 2 is a graph showing a plot of DBP-absorption vs. recycled quantity of residual gas.

Therefore, the recycle of residual gas was also staggered quantitatively in the same reactor which had been used in Examples 1 and 2. Again, one operated with a basic condition of 27 Nm³/h (880° C.) and a volume of combustion gas of 1.9 Nm³/h natural gas. In this case too, a uniform size of the primary particles and surface size of about 105 m²/g BET were striven for. With the introduction of 27 Nm³/h of air, a volume of 60 Nm³/h of exhaust gas is obtained. For practical reasons, the recycle of residual gas at 520° C. was varied only in the range of 0 to 15 Nm³/h. Table 3 and FIG. 2 show that the DBP absorption lowering may be adjusted precisely by the volume of the recycled quantity of residual gas.

TABLE 3

Production of carbon black with a BET-surface of 105 m²/g with and without recycling of exhaust gas, air volume constant 27 Nm³/h (880° C.) and natural gas 1.9 Nm³/h constant (Exhaust gas temperature 520° C.)

| | Volume of Exhaust gas Recycled Nm³/h | KCl - used g/kg Carbon Black Raw Material | Carbon Black Raw Material Quantity kg/h | Carbon Black kg/h | Yield % | BET- surface m²/g | DBP absorption ml/100 g |
|---|---|---|---|---|---|---|---|
| V151 | 0 | 0 | 7.790 | 4.910 | 63.0 | 104.2 | 144 |
| V152 | 5 | 0 | 7.860 | 4.950 | 62.9 | 106.2 | 132 |
| V153 | 10 | 0 | 8.800 | 4.900 | 62.8 | 102.0 | 122 |
| V154 | 15 | 0 | 7.710 | 4.780 | 62.0 | 104.8 | 115 |

EXAMPLE 4

Depending on the type of carbon black separation and on the further conduction of the exhaust gas, the latter is obtained at various temperatures. In Examples 1 through 3, the exhaust gas was returned into the combustion chamber at a temperature of 510°–520° C. However, there may also be some cases, wherein an operation with filter hose systems of low temperature resistance becomes necessary. In Example 4, again the reactor as in Example 1 was used, after injection of water for stopping the carbon black forming reaction it was cooled off by cooling surfaces of 160° C. and the carbon black was guided through a hose filter. By further conduction of the exhaust gas through metal pipes, the gas was cooled down to about 80° C., whereby a part of the water contained therein was condensed and discharged. The remainder of the exhaust gas was then used again the recycle experiments into the combustion chamber of the reactor. Table 4, shows a few results of these experimental runs. Here too, the developing pattern appears.

TABLE 4

Production of carbon black with a BET-surface of 105 m²/g with and without recycle of exhaust gas, air volume constant 27 Nm³/h (880° C.) and natural gas constant 1.9 Nm³/h (exhaust gas temperature 80° C.)

| | Volume of Exhaust gas Recycled Nm³/h | KCl - Used g/kg Carbon Black Raw Material | Volume Carbon Black Raw Material kg/h | Carbon Black kg/h | Yield % | BET- surface m²/g | DBP absorption ml/100 g |
|---|---|---|---|---|---|---|---|
| V117 | 0 | 0 | 7.860 | 4.940 | 62.8 | 102.0 | 143 |
| V121 | 10 | 0 | 7.240 | 4.490 | 62.0 | 104.8 | 121 |
| V119 | 0 | 4 | 7.890 | 4.940 | 62.5 | 106.2 | 108 |
| V123 | 10 | 4 | 7.200 | 4.480 | 62.2 | 106.2 | 89 |
| V120 | 0 | 6 | 7.890 | 4.940 | 62.5 | 104.8 | 106 |
| V124 | 10 | 6 | 7.220 | 4.480 | 62.2 | 104.7 | 85 |

EXAMPLE 5

In Example 5, again the reactor described in Example 1, was used. Here the attempt was to be made as to whether the return of the exhaust gas could be increased to a range lying within the same order of magnitude as the air volume used. Deviating from the preceding examples, in this case the exhaust gas was introduced into the reactor at a temperature of 880° C. Table 5 shows the results of this series of experiments in relation to the method of operation without recycle of gas. As is clear from the test values, a considerable lowering of the DBP-absorption will be achieved by the recycle of exhaust gas.

TABLE 5

Production of carbon black with a BET-surface of 105 m²/g with and without recycle of exhaust gas, air volume constant 27 Nm³/h (500° C.) and natural gas constant 1.9 Nm³/h (exhaust gas temperature 880° C.)

| | Volume of Exhaust gas Recycled Nm³/h | KCl - Used g/kg Carbon Black Raw Material | Carbon Black Raw Material Quantity kg/h | Carbon Black kg/h | Yield % | BET- surface m²/g | DBP absorption ml/100 g |
|---|---|---|---|---|---|---|---|
| V168 | 0 | 0 | 5.450 | 3.160 | 58.0 | 103.6 | 136 |
| V166 | 25 | 0 | 5.500 | 3.135 | 57.0 | 103.0 | 112 |

The preceding examples show that one will succeed with the process of the invention in lowering the carbon black structure continuously be returning a part of the exhaust gas obtained during the production furnace black into the combustion chamber.

The recycled exhaust gas will be as free of carbon black as possible for econommic reasons, since one would otherwise have to put up with losses as yield. The presence of carbon black in this exhaust gas however, does not disturb the process of the invention.

Moreover, the exhaust gas returned according to the invention, contrary to German AS No. 15 92 913, will contain combustible components such as for example, hydrogen and carbon monoxide. A typical analysis of exhaust gas shows the following composition:

| | Vol % |
|---|---|
| hydrogen: | 13.7 |
| carbon monoxide: | 10.6 |
| carbon dioxide: | 3.3 |
| water: | 19.7 |
| nitrogen: | 52.2 |
| methane: | 0.3 |
| acetylene/ethylene: | 0.2 |

In the above cited German AS No. 15 92 913, it was explained that the inert gas, which was recycled and freed of combustible components, would lead to a considerable increase in yield up to a doubling hereof. Surprisingly, it was found in the above experiments that the yield practically does not change.

This is the more astonishing, since the lean gas used in the invention and contrary to German AS No. 15 92 913 still contains combustible components, which are capable of tying up a part of the excess oxygen. Thus, less oxygen would be available for the combustion of the raw material.

On the other hand, another, likewise unexpected fact was found. If one compares Examples 3 and 4, wherein the temperature level of the recycled gases differs, then it turns out that in case of a higher temperature of the recycle gas the quantity of raw material used and the quantity of carbon black obtained clearly increase.

| Example | Return to Exhaust gas Quantity Nm³/h | Temper- ature °C. | Raw Material Used Quantity kg/h | % | Carbon Black Production Quantity kg/h | % |
|---|---|---|---|---|---|---|
| 4/V121 | 10 | 80 | 7.240 | 100 | 4.490 | 100 |
| 3/V153 | 10 | 520 | 7.800 | 108 | 4.900 | 109 |

(1) V121 set at equal to 100.

It is to be expected, the quantity of raw material used and of carbon black production would increase even more in case of a further increase of the temperature of the recylce gas and then would surpass even the level of the basic experiments wherein no gas is recycled.

This result too is contrary to German AS No. 15 92 913, in which the carbon black production remains constant and the quantity of raw material used would have to decline clearly.

It is not critical for purposes of the present invention described here, which measures are taken, in order to separate the carbon black; thus for example, the exhaust gases may be conducted via filters or cyclones. The process of the invention is not limited to the use of special reactors or the production of special carbon blacks, it is applicable basically for every furnace black reactor and for the production of any furnace black. However, it will be particularly effective under working conditions which, without the use of the measures according to the invention, would increase the carbon black structure too greatly.

From the foregoing tabulated data, it may be seen that recycling 5 to 25% (vol) of the exhaust gas produce a reduction in the carbon black structure as measured by DBP-absorption ranging variously from more than 8% to more than 20%.

Further modifications of the present invention will be apparent from the foregoing and are intended to be encompassed by the claims appended hereto.

We claim:

1. A process for controlling the structure of carbon black in the production of furnace blacks of lowered carbon black structure comprising burning a fuel with air without oxygen enrichment in a combustion chamber of a furnace black reactor thereby producing hot exhaust gases, preheating reaction air introduced into the combustion chamber to a temperature in the range of 400° to 1200° C., spraying carbon black raw material into said hot exhaust gases at a location downstream from the point of introduction of the fuel and completing the reaction further downstream by injecting water and cooling, whereby for the achievement of high yields and large raw material through-puts, a low ratio of combustion air:carbon black raw material is selected, removing from the exhaust gases wholly or 80 to 90% of the carbon black that is produced by the process and recycling at least 5% by volume of the exhaust gases to the combustion chamber without requiring removal of hydrogen and carbon monoxide, the recycled gas being employed at a temperature of 100° to 1200° C. thereby lowering the carbon black structure as measured by the absorption of dibutylphthalate, the structure of the carbon black being controlled by the volume of the recycled gas.

2. The process as defined in claim 1, wherein the volume of the recycled gas is increased thereby lowering the carbon black structure.

3. The process as defined in claim 1, wherein the reaction air introduced into the combustion chamber is preheated to a temperature in the range of 550° to 1050° C.

4. The process as defined in claim 1, wherein the recycled gas is employed at a temperature of 500° to 1050° C.

* * * * *